US012688699B2

(12) United States Patent
    Urayama

(10) Patent No.: US 12,688,699 B2
(45) Date of Patent: Jul. 21, 2026

(54) INFORMATION PROCESSING DEVICE AND METHOD

(71) Applicant: TOYOTA JIDOSHA KABUSHIKI KAISHA, Toyota (JP)

(72) Inventor: Yuya Urayama, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 293 days.

(21) Appl. No.: 18/418,771

(22) Filed: Jan. 22, 2024

(65) Prior Publication Data

US 2024/0257530 A1     Aug. 1, 2024

(30) Foreign Application Priority Data

Jan. 27, 2023   (JP) ................................. 2023-011373

(51) Int. Cl.
    *B60Q 5/00*      (2006.01)
    *G06V 20/58*     (2022.01)
    *G06V 40/10*     (2022.01)
(52) U.S. Cl.
    CPC ............. *G06V 20/58* (2022.01); *B60Q 5/006* (2013.01); *G06V 40/10* (2022.01)

(58) Field of Classification Search
    None
    See application file for complete search history.

(56) References Cited

U.S. PATENT DOCUMENTS

| | | | |
|---|---|---|---|
| 10,787,152 B1 * | 9/2020 | Zhang | B60R 25/25 |
| 12,179,656 B2 * | 12/2024 | Sakurada | B60Q 1/50 |

FOREIGN PATENT DOCUMENTS

| | | |
|---|---|---|
| JP | 2002-029384 A | 1/2002 |
| JP | 2019-175088 A | 10/2019 |

* cited by examiner

*Primary Examiner* — Dov Popovici
(74) *Attorney, Agent, or Firm* — SoraIP, Inc.

(57)           ABSTRACT

Determining whether a predetermined event has occurred based on a captured image including a predetermined location captured by an in-vehicle camera of one or more first vehicles; and determining that the predetermined event has occurred. The information processing device includes a control unit that, when determined, causes a second vehicle located around a predetermined location to sound its horn. When determining that a predetermined event has occurred, the control unit may report the occurrence of the predetermined event to a predetermined reporting destination.

1 Claim, 6 Drawing Sheets

SERVER

101 CPU

102 MEMORY

103 AUXILIARY STORAGE

104 COMMUNICATION UNIT

1

N1

2

VEHICLE

210 IN-VEHICLE DEVICE

211 CPU

212 MEMORY

213 AUXILIARY STORAGE

214 COMMUNICATION UNIT

215 INTERFACE

220 CAMERA

230 HORN

240 POSITION INFORMATION ACQUISITION UNIT

INFORMATION PROCESSING DEVICE AND METHOD

CROSS-REFERENCE TO RELATED APPLICATION

This application claims priority to Japanese Patent Application No. 2023-011373 filed on Jan. 27, 2023, incorporated herein by reference in its entirety.

BACKGROUND

1. Technical Field

The present disclosure relates to an information processing device and method, and relates to environmental maintenance around a vehicle.

2. Description of Related Art

A vehicle anti-theft method has been disclosed in which an abnormality is notified by sounding a horn of an automobile when a door of the automobile is opened (e.g., Japanese Unexamined Patent Application Publication No. 2002-029384 (JP 2002-029384 A)).

SUMMARY

The present disclosure provides an information processing device and a method that are capable of reducing damage caused by a predetermined event occurring in a vicinity a vehicle.

An aspect of the present disclosure is an information processing device, including a control unit that executes determining whether a predetermined event occurred, based on a captured image including a predetermined location, captured by an in-vehicle camera of one or a plurality of first vehicles, and causing a second vehicle situated in a vicinity of the predetermined location to sound a horn when determining that the predetermined event occurred.

Another aspect of the present disclosure is a method including a computer executing determining whether a predetermined event occurred, based on a captured image including a predetermined location, captured by an in-vehicle camera of one or a plurality of first vehicles, and causing a second vehicle situated in a vicinity of the predetermined location to sound a horn when determining that the predetermined event occurred.

According to aspects of the present disclosure, damage caused by a predetermined event occurring in the vicinity of the vehicle can be reduced.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
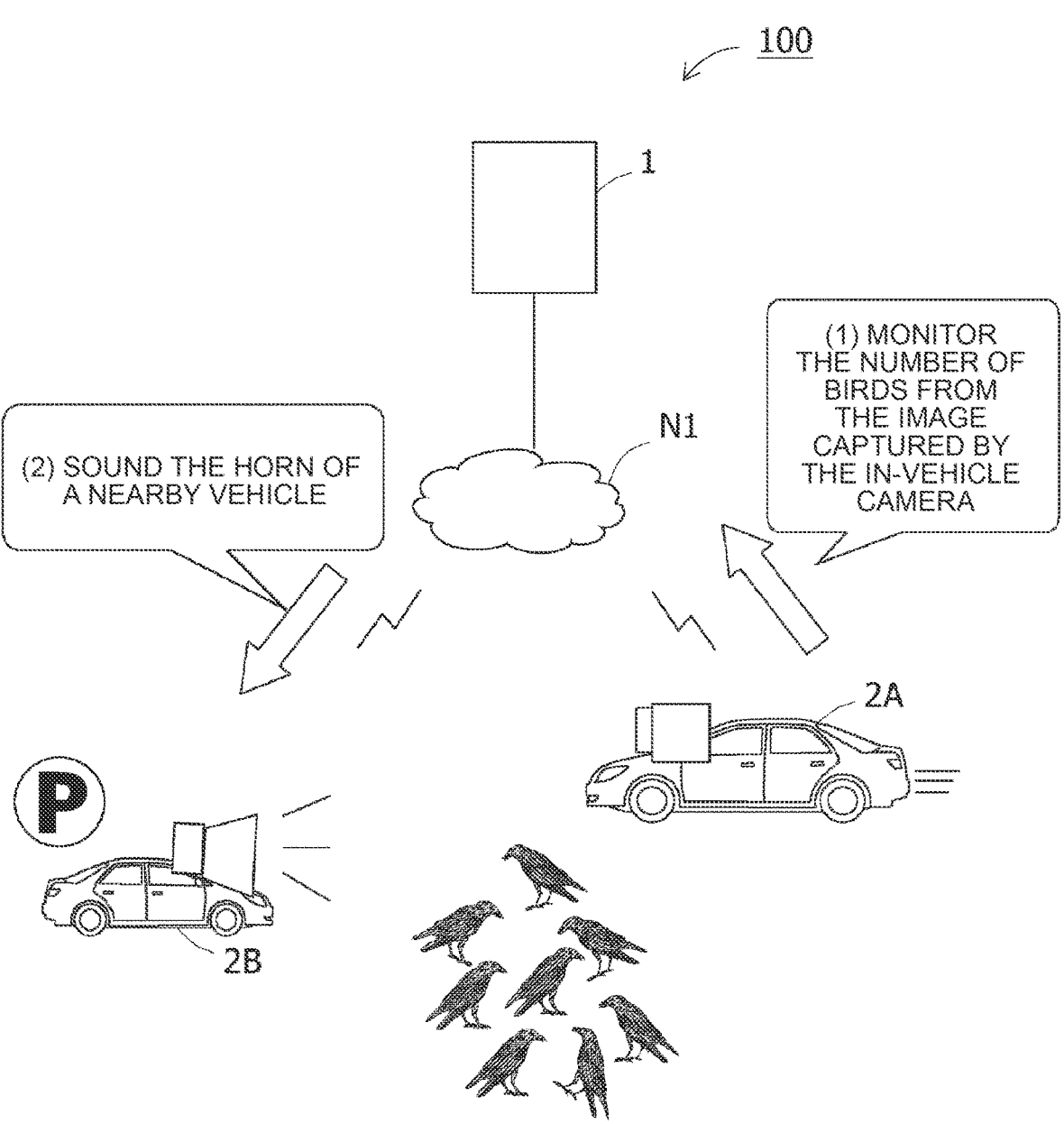
FIG. 1 is a diagram showing an example of the configuration of the fecal damage prevention system according to the first embodiment.

For example, places where wild birds gather are often soiled with wild bird droppings, and wild bird droppings pose a problem. For example, in garbage dumps, crows and the like come to scavenge garbage, which is a problem.

One aspect of the present disclosure solves the above problem using a vehicle. More specifically, one aspect of the present disclosure is an information processing device including a control unit. The control unit determines whether a predetermined event has occurred based on captured images including a predetermined location that are captured by in-vehicle cameras of one or more first vehicles. When it is determined that a predetermined event has occurred, the control unit causes a second vehicle positioned around the location to sound its horn.

The information processing device is, for example, a server or an in-vehicle device. The in-vehicle device is, for example, a drive recorder, a data communication device (DCM), a car navigation device, or the like. The control unit is, for example, a processor such as a Central Processing Unit (CPU) or a Digital Signal Processor (DSP). Predetermined events are, for example, the gathering of a predetermined number or more of birds, the entry of a predetermined animal into a predetermined place, and the like. However, the predetermined events are not limited to these. The predetermined event may be any event that can be detected from the image of the in-vehicle camera. When the information processing device is a server, the first vehicle equipped with the in-vehicle camera that captures the captured image and the second vehicle that sounds the horn may be the same vehicle or different vehicles. When the information processing device is an in-vehicle device, the first vehicle having the in-vehicle camera that captures the captured image and the second vehicle that sounds the horn are the same vehicle having the in-vehicle device.

According to one aspect of the present disclosure, the predetermined event can be resolved by causing the second vehicle located around the place where the predetermined event is occurring to sound its horn. As a result, it is possible to suppress the damage caused by the occurrence of the predetermined event. More specifically, when the predetermined event is the gathering of a predetermined number or more of wild birds, one aspect of the present disclosure can drive away the wild birds and suppress the damage caused by the droppings of the wild birds. Damage caused by a predetermined event includes, for example, ravening of garbage dumps by crows, raiding by animals intruding, and the like, in addition to the droppings of wild birds.

In one aspect of the present disclosure, the control unit may determine the volume of the horn to be sounded by the second vehicle according to at least one of the distance between the predetermined location and the second vehicle and the number of people around the second vehicle. Sound gets smaller as the distance from the source increases. Also, the horn is meaningless unless it is loud enough to drive away birds, for example. On the other hand, if the sound of the horn of the second vehicle is too loud, it may startle people around the second vehicle. The number of people around the second vehicle can be obtained, for example, from an image captured by an in-vehicle camera of the second vehicle. According to one aspect of the present disclosure, the volume of the horn to be sounded by the second vehicle can be set to a suitable volume according to the distance from the place where the predetermined event is occurring or the number of people in the vicinity.

In one aspect of the present disclosure, the control unit may determine whether a predetermined event has occurred based on images captured by an in-vehicle camera of one or more first vehicles, including a predetermined location collected during a predetermined period. For example, the number of migratory birds per unit time detected varies depending on the season at the predetermined place because the season in which migratory birds and the like come to a predetermined place is fixed. For example, when detecting the gathering of migratory birds as a predetermined event, it is preferable to detect the gathering of birds continuously over a long period of time rather than the temporary gathering of birds. Therefore, according to one aspect of the present disclosure, it is possible to efficiently detect an event that continuously occurs over a long period of time. Efficient detection means that there is a high possibility of excluding the detection of a predetermined event that occurs suddenly. As a result, for example, when a predetermined number or more of birds temporarily gather at a predetermined location, occurrence of a predetermined event is not determined, and the horns of surrounding vehicles are not sounded.

In one aspect of the present disclosure, when determining that the predetermined event occurred, the control unit may report occurrence of the predetermined event to a predetermined reporting destination. For example, when it is detected that migratory birds gather as a predetermined event, by notifying the department in charge of the government office as a predetermined report destination, the officials of the department in charge can take action before the fecal damage caused by migratory birds becomes chronic.

Hereinafter, embodiments of the present disclosure will be described with reference to the drawings. The configurations of the following embodiments are illustrative, and the present disclosure is not limited to the configurations of the embodiments.

First Embodiment

FIG. 1 is a diagram showing an example of the configuration of an excrement damage prevention system 100 according to the first embodiment. An excrement damage prevention system 100 according to the first embodiment is a system that suppresses bird feces damage using information collected from a plurality of vehicles.

The excrement damage prevention system 100 includes a server 1, a vehicle 2A that acquires images captured by an in-vehicle camera, and a vehicle 2B that sounds a horn. When not distinguishing between the vehicle 2A and the vehicle 2B, the vehicle 2 is used. Although there are a plurality of vehicles 2 included in the excrement damage prevention system 100 other than the vehicle 2A and the vehicle 2B, only the vehicle 2A and the vehicle 2B are shown in FIG. 1 for the sake of convenience.

The server 1, the vehicle 2A, and the vehicle 2B are each connected to the network N1 and can communicate through the network N1. The network N1 is, for example, a public line network such as the Internet.

The vehicle 2 is a connected car that can communicate with other devices by connecting to the network N1. The vehicle 2 transmits vehicle travel information to the server 1 at predetermined intervals. The vehicle running information includes information of various sensors acquired while the vehicle 2 is running. More specifically, the vehicle travel information includes identification information of the vehicle 2, a time stamp, position information, travel speed, an image captured by an in-vehicle camera, and the like. However, the information included in the vehicle travel information is not limited to these. The transmission period of the vehicle travel information is arbitrarily set by the user of the vehicle 2 or the administrator of the excrement damage prevention system 100, for example, between 1 second and 1 minute. Note that the vehicle travel information may also be transmitted when a predetermined event occurs. Events that trigger the transmission of vehicle travel information include, for example, when the ignition of the vehicle 2 is turned on and off, and when a collision is detected.

The server 1 monitors the image captured by the in-vehicle camera collected from the vehicle 2 and monitors the number of birds in a predesignated geographical range. Locations to be monitored may be set, for example, by an administrator of the excrement damage prevention system 100, or may be received from a person in charge of a department in charge of fecal damage countermeasures at a government office. For example, when the server 1 detects that there are more than a predetermined number of birds at the location to be monitored from the captured image received from the vehicle 2A, the server 1 identifies the vehicle 2B positioned around the location to be monitored. The position information of the vehicle 2B can be identified from vehicle travel information. The server 1 instructs the vehicle 2B to sound its horn. Upon receiving the instruction, the vehicle 2B sounds its horn. By horning the vehicle 2B, it is possible to intimidate and drive away birds existing in the place to be monitored, and to suppress fecal damage. The vehicle 2A and the vehicle 2B may be the same vehicle, or may be different vehicles.

Further, when the average number of birds detected per unit time in the specified range in the most recent predetermined period is equal to or greater than a predetermined threshold value, the server 1 notifies, for example, the department in charge of fecal damage countermeasures in the government office. As a result, for example, at the timing when migratory birds begin to gather in a specified range, the person in charge of fecal damage countermeasures at the government office can take countermeasures against fecal damage. In the first embodiment, the server 1 is an example of an "information processing device". Vehicle 2A is an example of a "first vehicle". Vehicle 2B is an example of a "second vehicle".

Figure 2:
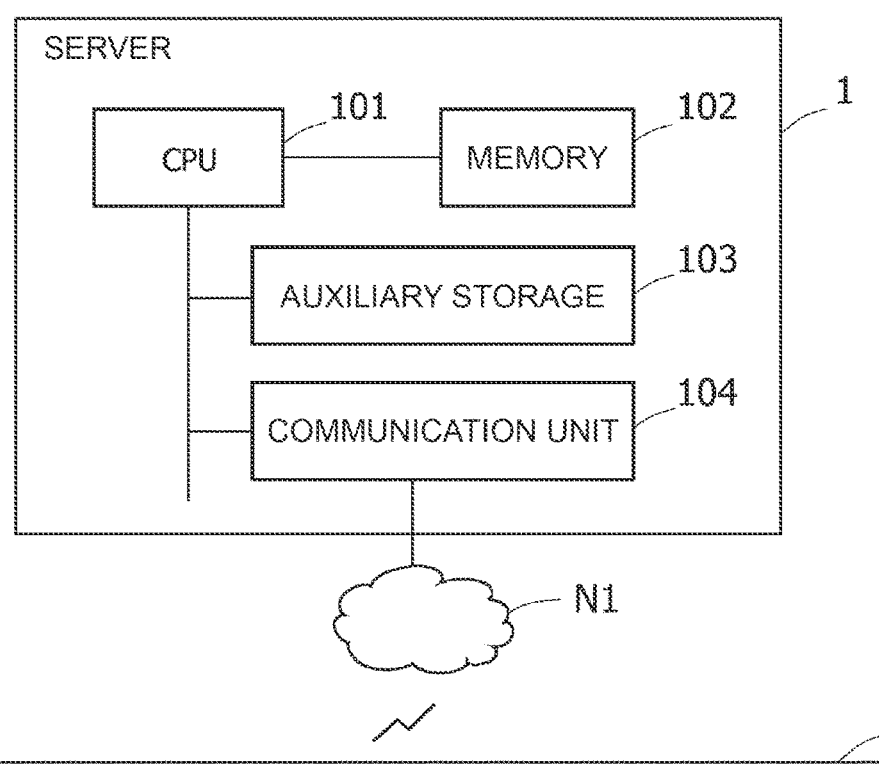
FIG. 2 is a diagram showing an example of the hardware configuration of the server and vehicle.
Figure 2:
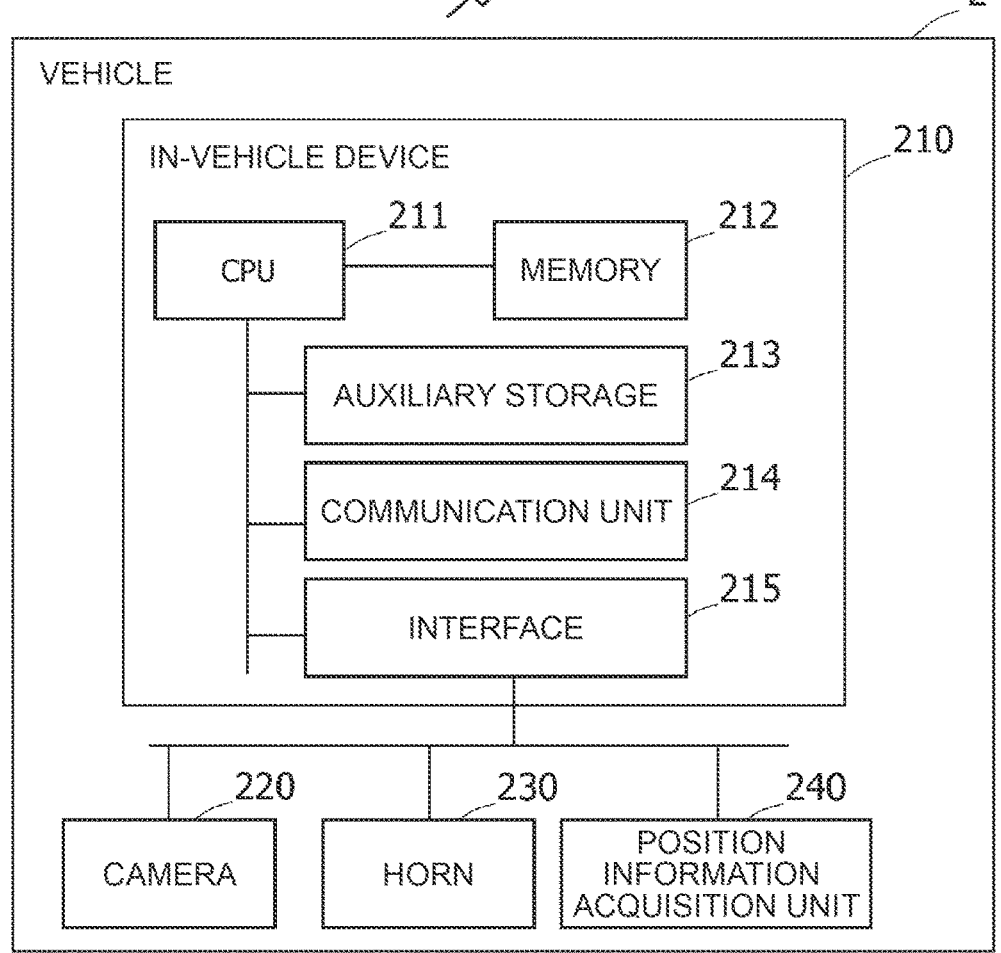

FIG. 2 is a diagram showing an example of hardware configurations of the server 1 and the vehicle 2. The server 1 includes a CPU 101, a memory 102, an auxiliary storage device 103, and a communication unit 104 as a hardware configuration. The auxiliary storage device 103 is, for example, a Hard Disk Drive (HDD), a Solid State Drive (SSD), or the like. Programs held in the auxiliary storage device 103 include, for example, an operation system (OS) and a plurality of other programs. Memory 102 includes, for example, semiconductor memory such as Read Only Memory (ROM) and Random Access Memory (RAM). Each of the memory 102 and the auxiliary storage device 103 is an example of a computer-readable recording medium.

The CPU 101 executes various processes by loading the OS and various other programs stored in the auxiliary storage device 103 into the memory 102 and executing them.

The number of CPUs 101 is not limited to one, and a plurality of CPUs may be provided. The CPU 101 is an example of a "control unit".

The communication unit 104 is, for example, a module that connects a network cable such as a Local Area Network (LAN) card and an optical module, and has a signal processing circuit. The communication unit 104 is not limited to a circuit connectable to a wired network, and may be a wireless signal processing circuit capable of processing wireless signals of a wireless communication network such as WiFi.

Next, in FIG. 2, constituent elements related to the processing of the excrement damage prevention system 100 are extracted from the configuration of the vehicle 2 and shown, and the configuration of the vehicle 2 is not limited to that shown in FIG. 2. The vehicle 2 includes an in-vehicle device 210, a camera 220, a horn 230 and a position information acquisition unit 240. These components are connected by, for example, a Controller Area Network (CAN) network and an in-vehicle network such as in-vehicle Ethernet.

Camera 220 is, for example, a camera used in a drive recorder mounted on vehicle 2. The camera 220 is installed so that the periphery of the vehicle 2 becomes an imaging range. More specifically, for example, the camera 220 is installed near the top of the windshield so that the front of the vehicle 2 is the imaging direction. The number of cameras 220 is not limited to one, and a plurality of cameras may be provided. For example, the camera 220 may include a rear camera installed so that the rear of the vehicle 2 is the imaging direction, or a 360-degree camera capable of simultaneously photographing the front, rear, side, and interior of the vehicle 2.

Horn 230 outputs a warning sound when a signal is received from in-vehicle device 210 in addition to when the switch is pressed by a user's operation. The position information acquisition unit 240 is, for example, a Global Positioning System (GPS) receiver. The position information acquisition unit 240 acquires position information of the vehicle 2 at a predetermined cycle. The period at which the position information acquisition unit 240 acquires position information is set, for example, between 0.1 seconds and 1 second.

In the first embodiment, the in-vehicle device 210 acquires the captured image of the camera 220 with a predetermined period, and transmits vehicle driving information to the server 1. The in-vehicle device 210 is, for example, a data communication device (DCM), a drive recorder having a communication function, or a car navigation system. In FIG. 2, the in-vehicle device 210 is assumed to be a data communication device. The in-vehicle device 210 includes a CPU 211, a memory 212, an auxiliary storage device 213, a communication unit 214, and an interface 215 as a hardware configuration. The CPU 211, memory 212, and auxiliary storage device 213 are similar to the CPU 101, memory 102, and auxiliary storage device 103, respectively.

The communication unit 214 communicates with an external device based on, for example, a mobile communication system such as 5G, 6G, and 4G, or a wireless communication system such as Wi-Fi or Dedicated Short Range Communications (DRSC). Interface 215 is an interface for connecting to an in-vehicle network. Note that the hardware configurations of the server 1 and the vehicle 2 are not limited to the configurations shown in FIG. 2.

Figure 3:
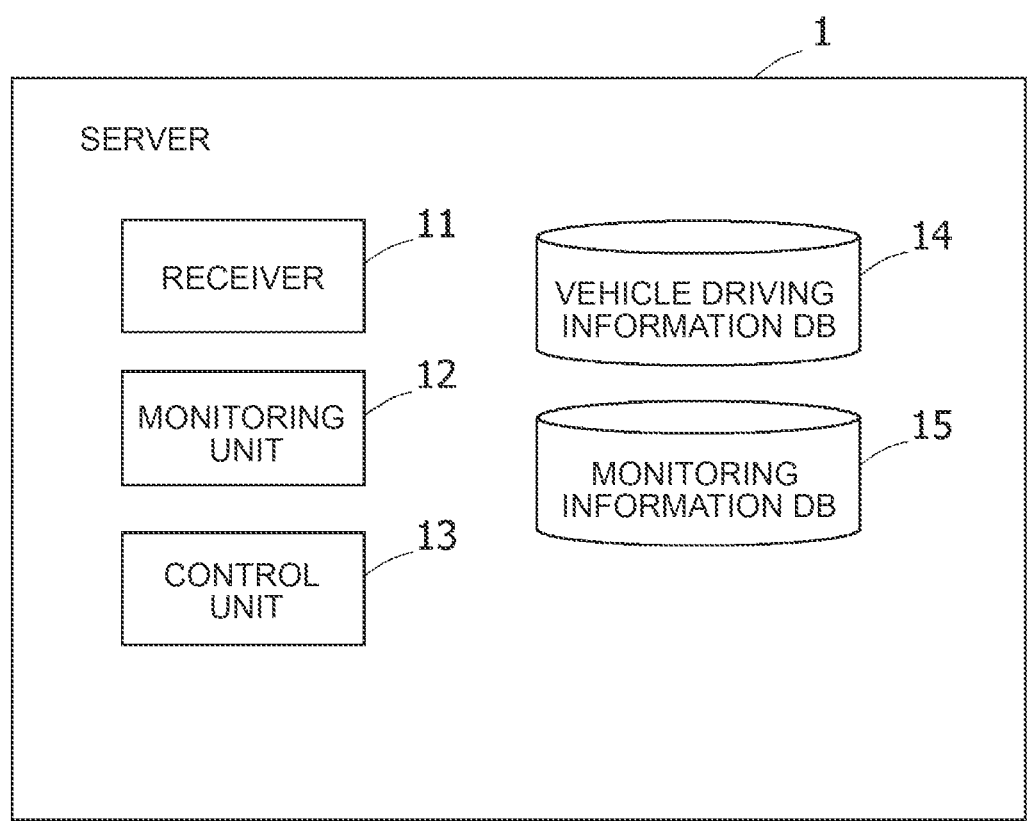
FIG. 3 is a diagram showing an example of the functional configuration of the server.

FIG. 3 is a diagram showing an example of the functional configuration of the server 1. The server 1 includes a receiving unit 11, a monitoring unit 12, a control unit 13, a vehicle travel information DB 14, and a monitoring information DB 15 as functional configurations. The functions of these functional components are achieved by executing predetermined programs.

The receiving unit 11 receives vehicle travel information from the vehicle 2 at predetermined intervals. The receiving unit 11 stores the received vehicle travel information in the vehicle travel information DB 14.

The monitoring unit 12 analyzes the image captured by the in-vehicle camera included in the vehicle travel information received from each vehicle 2 and monitors the number of birds within the specified range. More specifically, the monitoring unit 12 monitors, at a predetermined cycle, a plurality of vehicle travels whose position information is included in a specified range from among the vehicle travel information stored in the vehicle travel information DB 14 during the most recent cycle. Extract information. The monitoring unit 12 performs image recognition processing on each of the captured images of the in-vehicle camera included in the plurality of extracted vehicle travel information. The monitoring unit 12 acquires, for example, the average number of birds detected from each captured image as the number of birds within the specified range as a result of image recognition processing. The cycle for acquiring the number of birds within the specified range is arbitrarily set by the administrator of the excrement damage prevention system 100, for example, between one minute and one hour. The monitoring unit 12 outputs the number of birds within the specified range to the control unit 13. If there are multiple specified ranges, the monitoring unit 12 acquires the number of birds for each specified range.

The control unit 13 executes bird scare processing and fecal damage prediction notification processing for the specified range. In the bird chasing process, when the number of birds within the specified range notified by the monitoring unit 12 is equal to or greater than the threshold, the control unit 13 refers to the vehicle travel information DB 14 to identify the vehicle 2B disposed in the specified range and around the specified range, and transmits an instruction to sound the horn to the identified vehicle 2B. Therefore, the execution period of the bird shunting process is the period in which the number of birds within the specified range is acquired by the monitoring unit 12. However, the present disclosure is not limited to this, and the execution cycle of the bird shunting process may be longer than the cycle of obtaining the number of birds within the specified range of the monitoring unit 12. The execution cycle of the bird chasing process may be arbitrarily set by, for example, the administrator of the excrement damage prevention system 100.

The threshold for the number of birds within the specified range may be a value specified by, for example, an administrator of the excrement damage prevention system 100 or a person in charge of a government office. Alternatively, the threshold for the number of birds within the specified range may be changed according to, for example, the season and the time period (morning, noon, night, etc.). For example, in seasons when migratory birds come, a larger threshold value may be set than in seasons when migratory birds do not. Alternatively, the threshold for the number of birds within the specified range may be set based on the average number of birds detected per unit time in a predetermined period.

Further, the control unit 13 may control the volume of the horn sounded by the vehicle 2B. For example, unless the sound of the horn of the vehicle 2B is loud enough to intimidate the birds within the specified range, the birds cannot be driven away. Therefore, the control unit 13 may instruct the vehicle 2B to increase the volume of the horn as the distance from the specified range to the vehicle 2B increases. Alternatively, the control unit 13 may control the volume of the horn sounded by the vehicle 2B according to the number of people present around the vehicle 2B. The number of people present around the vehicle 2B is obtained, for example, by analyzing the image captured by the in-vehicle camera of the vehicle 2B. For example, the control unit 13 may instruct the vehicle 2B to increase the volume of the horn as the number of people present around the vehicle 2B increases. This is to suppress surrounding people from being startled by the horn of the vehicle 2B.

Further, the control unit 13 may determine the volume of the horn to be sounded by the vehicle 2B in consideration of both the distance from the specified range to the vehicle 2B and the number of people present around the vehicle 2B. For example, first, the volume is determined according to the distance from the specified range to the vehicle 2B. The control unit 13 may instruct the vehicle 2B to sound the horn at the determined volume when the determined volume is smaller than the upper limit value of the volume according to the number of surrounding people of the vehicle 2B. Note that the method of controlling the volume of the horn sounded by the vehicle 2B is not limited to the method described above.

Further, the control unit 13 may specify the type of bird detected from the captured image, and change the frequency of the horn to be sounded by the vehicle 2B according to the type of bird. For example, when a bat is detected, the control unit 13 may 13 may set the frequency of the horn sounded by the vehicle 2B outside the human audible range (20 Hz to 20 KHz) and instruct the vehicle 2B to do so.

Also, the range for specifying the vehicle 2B may be arbitrarily set by the administrator of the excrement damage prevention system 100, for example, within a range of 1 m to 10 m from the specified range. Alternatively, the range for specifying the vehicle 2B may be set, for example, from the specified range to a range that can be reached with a sound volume that can intimidate birds when the sound volume of the car horn of the vehicle 2B is at its maximum. The setting method of the range for specifying the vehicle 2B is not limited to the above method.

In the feces damage prediction notification process, the control unit 13 acquires the average number of birds detected per unit time in the specified range in the most recent predetermined period. Then, when the average value is greater than or equal to the threshold value, the control unit 13 notifies a predetermined report destination of the occurrence of a flock of birds within the specified range. The execution cycle of the feces damage prediction notification process and the predetermined period for acquiring the average number of detected birds per unit time are, for example, one day to one week, and are arbitrarily set by an administrator of the excrement damage prevention system 100 or a person in charge of a government office.

The unit time for calculating the average number of detected birds within the specified range is, for example, 30 minutes, 1 hour, or 1 day. The unit time for which the average value of the number of detected birds within the specified range is obtained may be a value specified by, for example, the administrator of the excrement damage prevention system 100 or the person in charge of the government office.

The average value of the number of birds detected per unit time in the most recent predetermined period can be obtained, for example, by acquiring captured images of a specified range captured in the most recent predetermined period from the vehicle travel information DB 14, and performing image recognition on each captured image. Processing may be performed to tally and acquire the number of birds included in each captured image obtained as a result of the image recognition processing. Alternatively, the control unit 13 records the average value of the number of birds detected from each captured image in the execution cycle of the bird shunting process, which is calculated in the bird shunting process, and records the recorded average value for the most recent predetermined period. The number of birds detected per unit time in the most recent predetermined period may be averaged by totaling the number of birds detected per unit time.

The threshold for the average number of birds detected per unit time may be a value specified by, for example, the administrator of the excrement damage prevention system 100 or the person in charge of the government office. Alternatively, it may be set in the same manner as the threshold for the number of birds within a specified range for the bird shunting process. The method of notifying the occurrence of a flock of birds within the specified range may be, for example, e-mail, push delivery, or call origination to the specified terminal.

The vehicle travel information DB 14 and the monitoring information DB 15 are created within the storage area of the auxiliary storage device 103 of the server 1. The vehicle travel information DB 14 holds vehicle travel information received from each vehicle 2 at a predetermined cycle. The monitoring information DB 15 holds monitoring information that is information about monitoring the number of birds. The monitoring information includes, for example, the designated range of the monitoring target, the threshold value for chasing away birds, the threshold value for predictive fecal damage notification processing, information on the source of the monitoring request, and information on the destination of the predictive fecal damage notification processing. Note that the functional configuration of the server 1 is not limited to the example shown in FIG. 3.

Processing Flow

Figure 4:
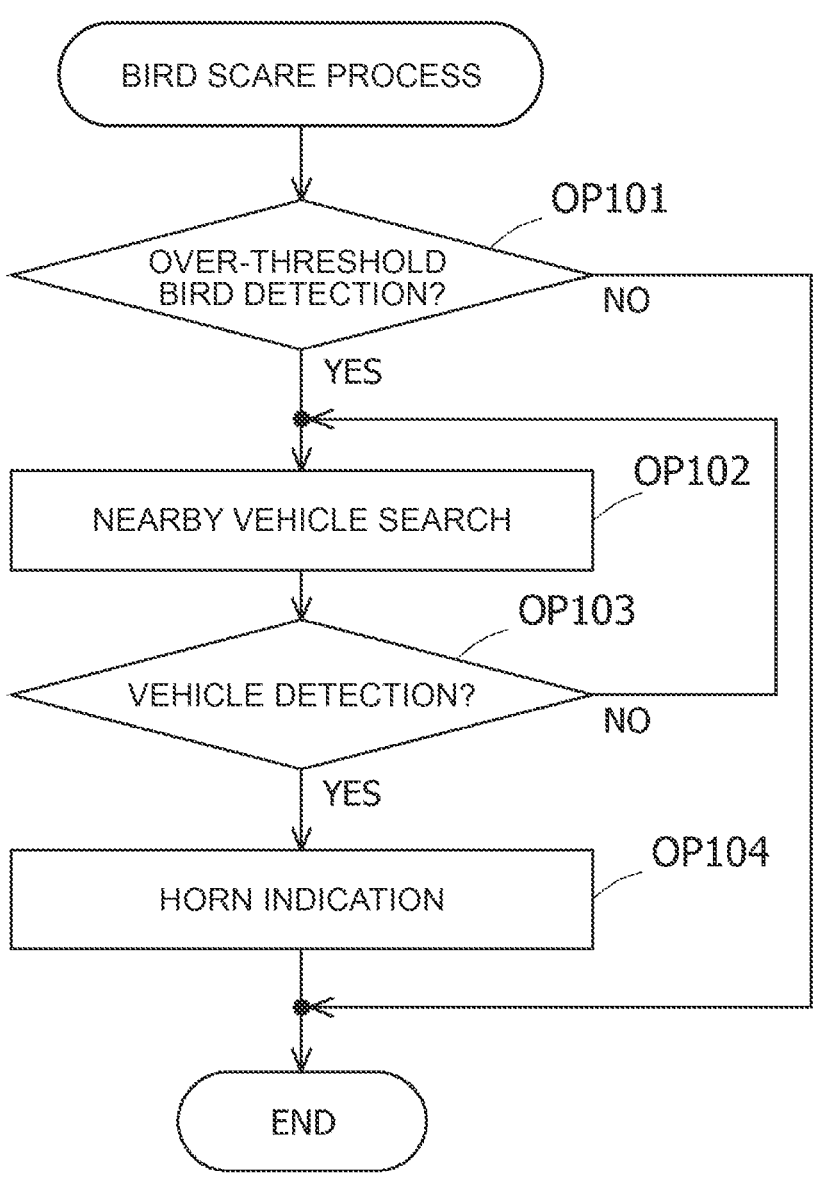
FIG. 4 is an example of a flowchart of bird scare processing.

FIG. 4 is an example of a flowchart of bird scare processing. The processing shown in FIG. 4 is repeatedly executed at a predetermined cycle. 4 is executed by the CPU 101 of the server 1, but for the sake of convenience, functional components will be mainly described. The same applies to the flowchart in FIG. 4 and subsequent figures. The process of FIG. 4 is executed for each monitoring information held in the monitoring information DB 15, that is, for each specified range of monitoring targets.

In OP101, the control unit 13 determines whether the number of birds existing within the specified range notified from the monitoring unit 12 is equal to or greater than a threshold. If the number of birds existing within the specified range is equal to or greater than the threshold (OP101: YES), the process proceeds to OP102. If the number of birds existing within the specified range is less than the threshold (OP101: NO), the processing shown in FIG. 4 ends.

In OP102, the control unit 13 refers to the vehicle travel information DB 14 to search for vehicles 2 existing within and around the specified range. In OP103, the control unit 13 determines whether or not the vehicle 2B to sound the horn has been detected. For example, when a plurality of vehicles 2 exist within and around the specified range, the control unit 13 honks the horn in the order of parked vehicle 2>stopped vehicle 2>moving vehicle 2. A vehicle 2B to be sounded is detected. That is, if there is a parked vehicle 2, the control unit 13 detects the vehicle 2. When the parked vehicle 2 does not exist, if the stopped vehicle 2 exists, the control unit 13 detects the stopped vehicle 2. If neither the parked vehicle 2 nor the stopped vehicle 2 exists, the control unit 13 detects the vehicle 2 that is running.

If the vehicle 2B that sounds the horn can be detected (OP103: YES), the process proceeds to OP104. If the vehicle 2B that sounds the horn cannot be detected (OP103: NO), the process proceeds to OP102. For example, if the vehicle 2B that sounds the horn cannot be detected even after a predetermined time has passed, the processing shown in FIG. 4 ends.

In OP104, the control unit 13 transmits an instruction to sound the horn to the vehicle 2B detected in OP103. At this time, the control unit 13 may determine the volume of the horn according to the distance between the specified range and the vehicle 2B and/or the number of people present around the vehicle 2B. After that, upon receiving the instruction, the vehicle 2B can sound its horn and scare away the birds within the specified range. After that, the process shown in FIG. 4 ends.

Figure 5:
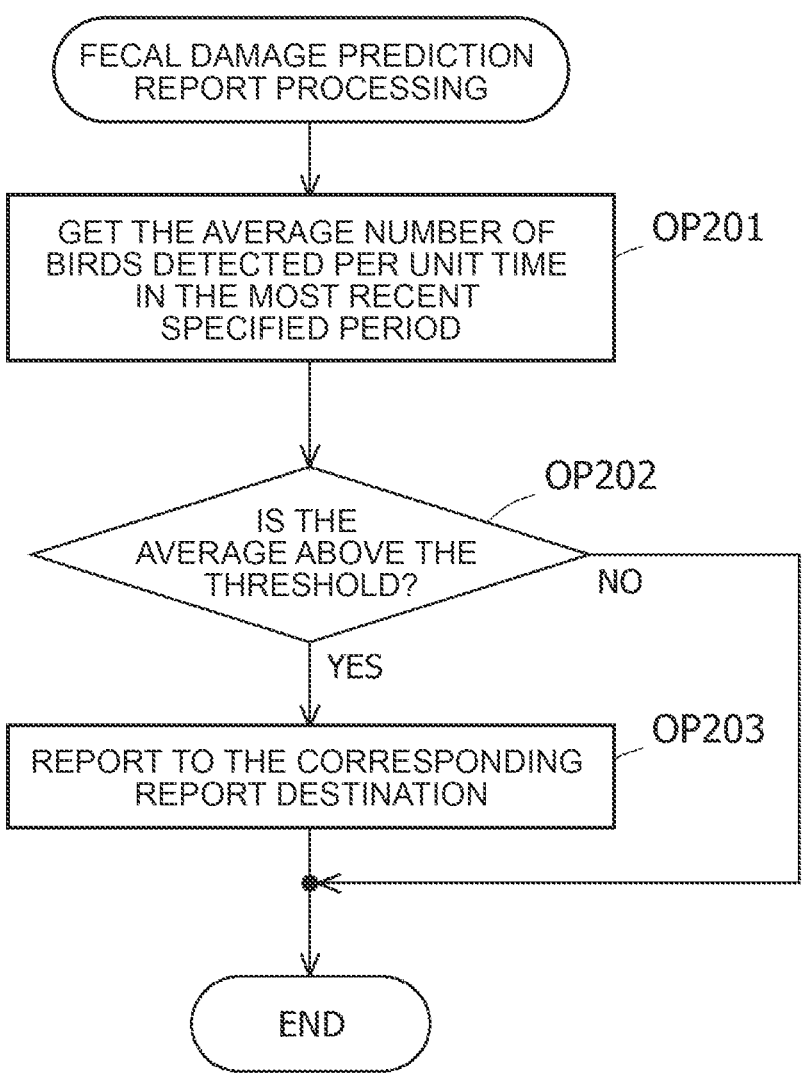
FIG. 5 is an example of a flowchart of excrement damage prediction notification processing.

FIG. 5 is an example of a flowchart of excrement damage prediction notification processing. The processing shown in FIG. 5 is executed at a predetermined cycle. In OP201, the control unit 13 acquires the average number of birds detected per unit time in the most recent predetermined period. In OP202, it is determined whether the average number of birds detected per unit time is greater than or equal to the threshold. If the average number of birds detected per unit time is greater than or equal to the threshold (OP202: YES), the process proceeds to OP203. If the average number of birds detected per unit time is less than the threshold (OP202: NO), the process shown in FIG. 5 ends.

In OP203, the control unit 13 notifies the reporting destination associated with the specified range in the monitoring information DB 15 of the occurrence of a flock of birds within the specified range. After that, the processing shown in FIG. 5 is terminated.

Action Effect of First Embodiment

According to the first embodiment, when a predetermined number of birds are gathered within the specified range, they are detected from the captured image of the vehicle 2A, and the horns of the surrounding vehicles 2B are sounded, so that the birds are removed from the specified range. As a result, it is possible to suppress birds from settling in the specified range and to prevent bird droppings.

Further, in the first embodiment, when the average value of the number of birds detected per unit time is greater than or equal to the threshold value for a predetermined period of time, a predetermined notification destination is notified that birds are gathering in a designated range. As a result, for example, it is possible to detect early on when migratory birds begin to gather in a designated range in the season when migratory birds come, and the department in charge of the government office is notified, so that the person in charge of the department in charge can prevent migratory birds from chronically migrating. Precautions can be taken against fecal damage prior to staying in designated areas. It should be noted that the bird scare process and fecal damage prediction notification process by the server 1 of the first embodiment can also be applied to other events. For example, if a garbage dump is designated as a designated range and it is detected that a crow is in the garbage dump, the server 1 may sound the horn of a nearby vehicle 2B to drive away the crow.

Second Embodiment

In the second embodiment, the vehicle 2 alone executes the bird scare process. In the second embodiment, the description overlapping with the first embodiment will be omitted. In the second embodiment, the hardware configuration of the vehicle 2 is the same as in the first embodiment. In the second embodiment, when the vehicle 2 detects more than a predetermined number of birds from the image captured by the camera 220 when the vehicle 2 exists around the specified range, it sounds its horn to drive away the birds.

Figure 6:
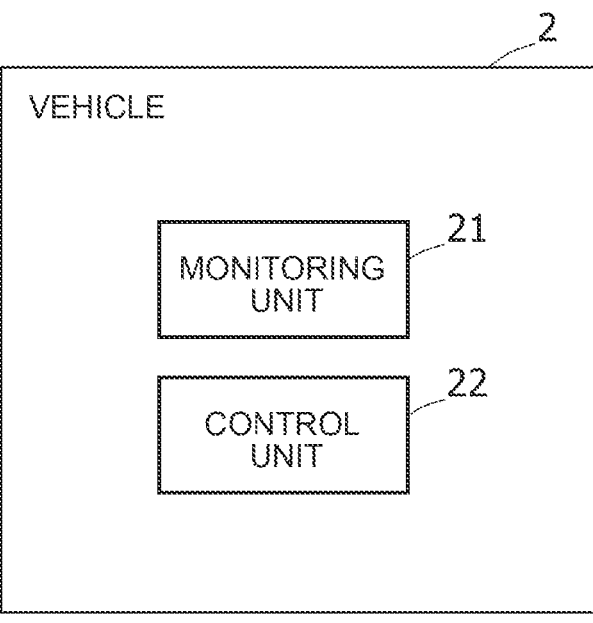
FIG. 6 is a diagram showing an example of the functional configuration of a vehicle according to the second embodiment.

FIG. 6 is a diagram showing an example of the functional configuration of the vehicle 2 according to the second embodiment. The vehicle 2 includes a monitoring unit 21 and a control unit 22 as functional configurations. The functions of these functional components are achieved by CPU 211 of in-vehicle device 210 executing a predetermined program.

When the vehicle 2 exists within the specified range, the monitoring unit 21 performs image recognition processing on the image captured by the camera 220 to detect the number of birds. The specified range is notified from the server 1 or set by the user of the vehicle 2, for example. For example, the camera 220 takes images at a predetermined cycle, and the monitoring unit 21 executes image recognition processing according to the image taking cycle. The number of birds acquired from the image captured by camera 220 is notified to control unit 22.

The control unit 22 sounds the horn 230 when the number of birds notified from the monitoring unit 21 is equal to or greater than the threshold. As in the first embodiment, the volume of the horn 230 may be determined according to the distance from the specified range and/or the number of people around. The period in which the control unit 22 executes the bird shunting process may be, for example, a period longer than the imaging period of the camera 220. In that case, the average value of the number of birds detected in the captured images captured during the execution cycle of the bird shunting process is used. The threshold for the number of birds detected from the image captured by the camera 220, which determines whether to sound the horn 230, may be notified from the server 1 or set by the user of the vehicle 2, or determined by the control unit 22 based on the statistical value of the number of birds detected from the captured image within the designated range of the camera 220, for example. The in-vehicle device 210 in the second embodiment is an example of an "information processing device".

According to the second embodiment, each vehicle 2 can execute bird scare processing even by itself, and can suppress bird feces damage in a specified range. In addition, the vehicle 2 may use the image captured by the camera 220 to execute the excrement damage prediction notification process as in the first embodiment. The threshold for the average number of birds detected per unit time and the information of the report destination may be notified from the server 1 or may be set by the user of the vehicle 2.

The bird scare process by the vehicle 2 of the second embodiment can also be applied to other events. For example, by setting the home of the user of the vehicle 2 as the specified range and detecting a person instead of a bird, when a suspicious person entering the home is detected from the captured image of the camera 220, the horn 230 is sounded. It can be applied as follows. In this case, the faces of the family members may be registered so that the monitoring unit 21 detects persons other than the family members as suspicious persons. For example, by setting the home of the user of the vehicle 2 as the specified range and detecting raindrops instead of birds, when it is detected from the captured image of the camera 220 that it is raining, the horn 230 is sounded, It can be applied such as informing family members.

OTHER EMBODIMENTS

The above-described embodiment is merely an example, and the present disclosure may be appropriately modified and implemented without departing from the scope thereof.

The processes and means described in the present disclosure can be freely combined and implemented as long as no technical contradiction occurs.

Further, the processes described as being executed by one device may be shared and executed by a plurality of devices. Alternatively, the processes described as being executed by different devices may be executed by one device. In the computer system, it is possible to flexibly change the hardware configuration (server configuration) for realizing each function.

The present disclosure can also be implemented by supplying a computer with a computer program that implements the functions described in the above embodiment, and causing one or more processors of the computer to read and execute the program. Such a computer program may be provided to the computer by a non-transitory computer-readable storage medium connectable to the system bus of the computer, or may be provided to the computer via a network. The non-transitory computer-readable storage medium is, for example, a disc of any type such as a magnetic disc (floppy (registered trademark) disc, HDD, etc.) and an optical disc (compact disc read-only memory (CD-ROM), digital versatile disc (DVD), Blu-ray disc, etc.), a ROM, a RAM, an EPROM, an electrically erasable programmable read only memory (EEPROM), a magnetic card, a flash memory, an optical card, and any type of medium suitable for storing electronic commands.

What is claimed is:

1. An information processing device comprising a processor configured to determine whether a predetermined event occurred, based on a captured image including a predetermined location, captured by an in-vehicle camera of one or a plurality of first vehicles, and cause a second vehicle situated in a vicinity of the predetermined location to sound a horn when determining that the predetermined event occurred, wherein the processor decides a volume of the horn to be sounded by the second vehicle, in accordance with at least one of a distance between the predetermined location and the second vehicle, and a count of people in a vicinity of the second vehicle.

\* \* \* \* \*